Nov. 22, 1966     J. P. RAFFE     3,286,294
POLISHING DEVICES
Filed Aug. 11, 1964     5 Sheets-Sheet 1
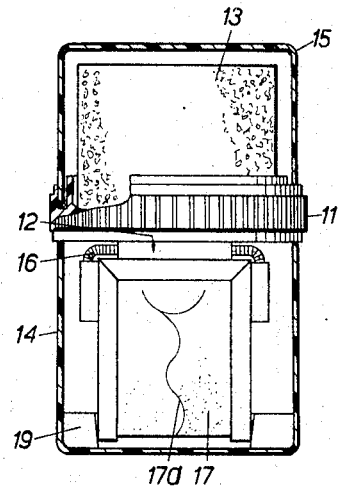
-FIG. 1.-
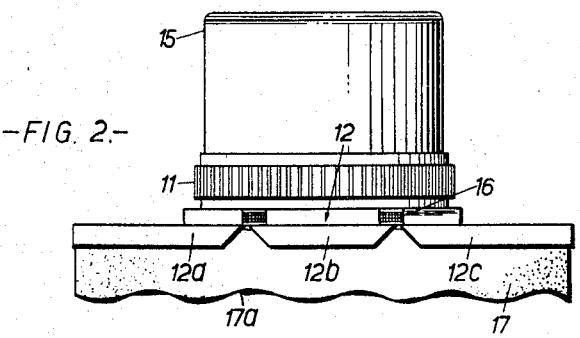
-FIG. 2.-
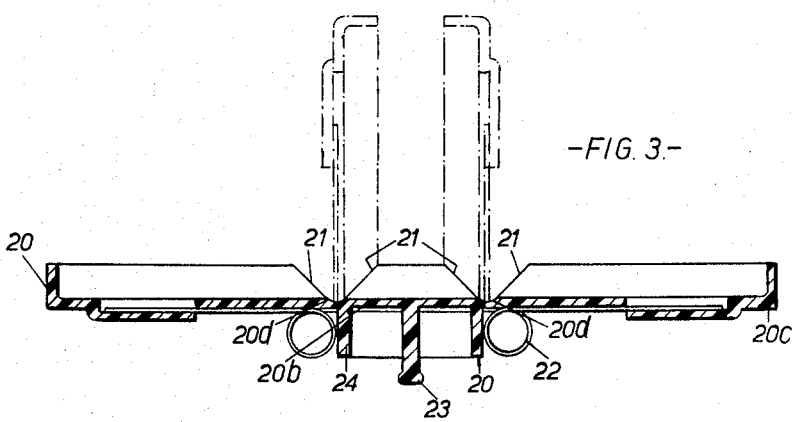
-FIG. 3.-
INVENTOR:
JOSEPH P. RAFFE
BY
ATTORNEYS Nov. 22, 1966 J. P. RAFFE 3,286,294
POLISHING DEVICES
Filed Aug. 11, 1964 5 Sheets-Sheet 2
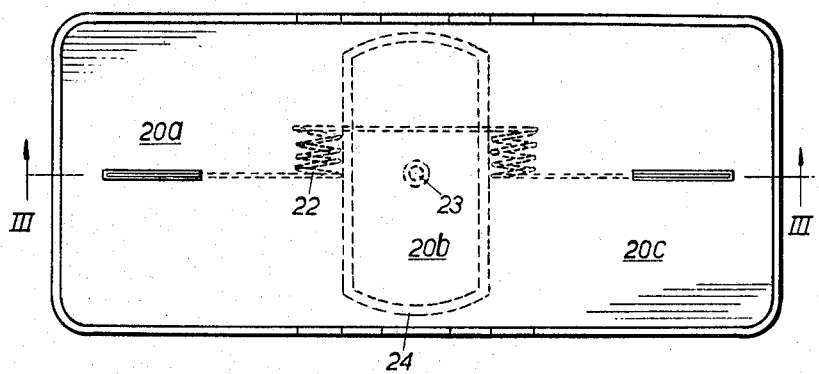
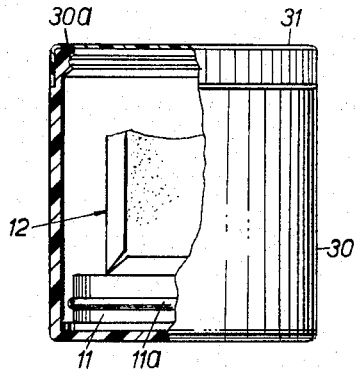
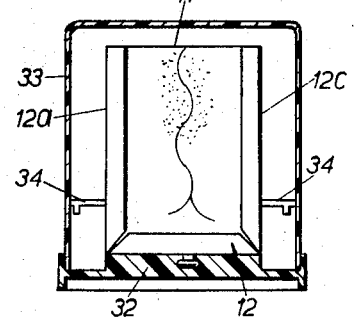
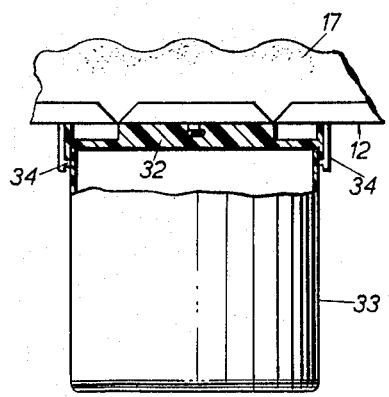
INVENTOR:
Joseph P. Raffe
BY
Browne, Schuyler + Burridge
ATTORNEYS Nov. 22, 1966   J. P. RAFFE   3,286,294
POLISHING DEVICES
Filed Aug. 11, 1964   5 Sheets-Sheet 3
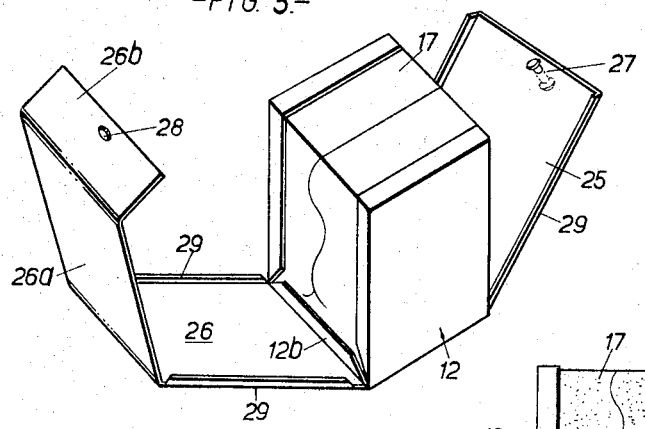
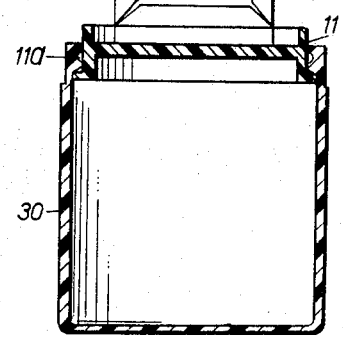
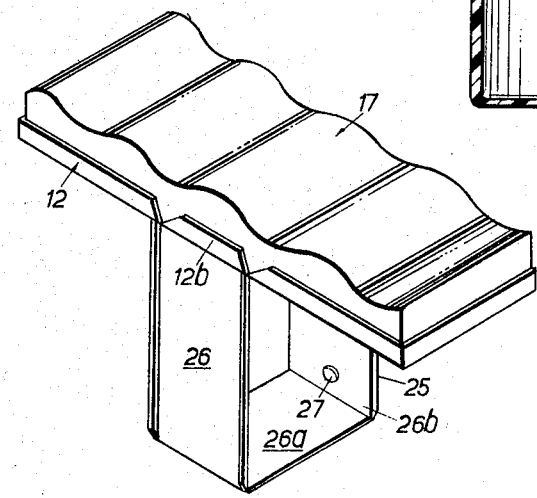
INVENTOR:
JOSEPH P. RAFFE
BY
ATTORNEYS

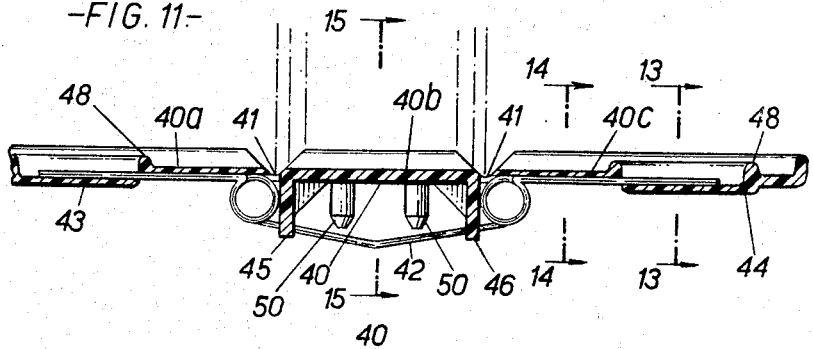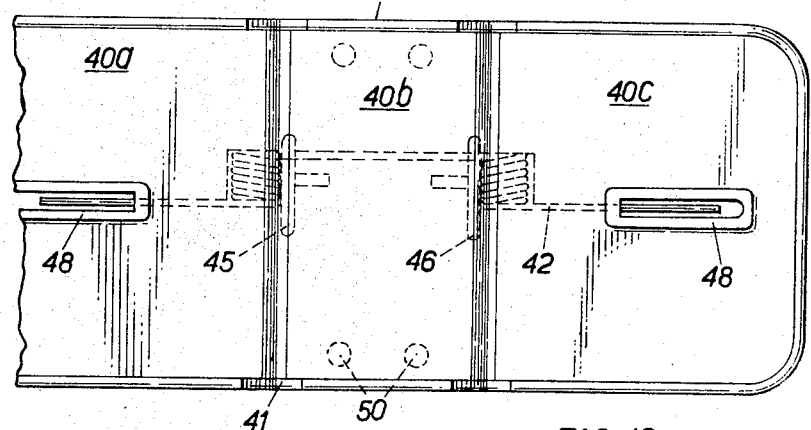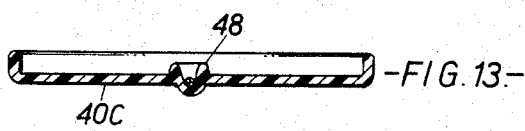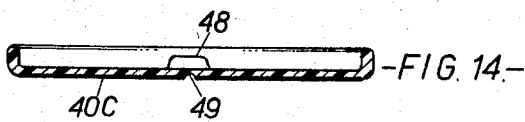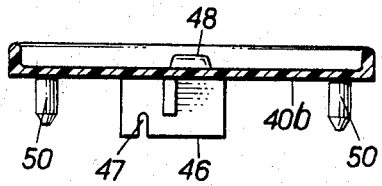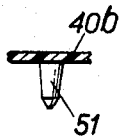

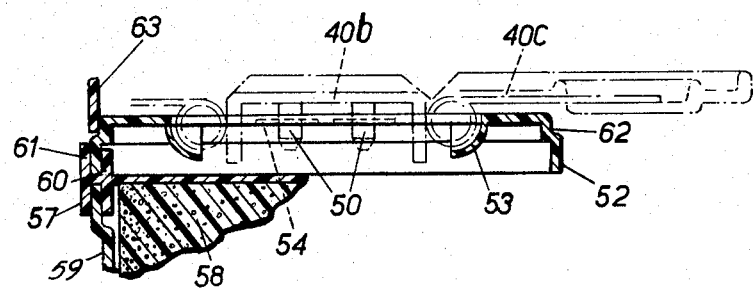
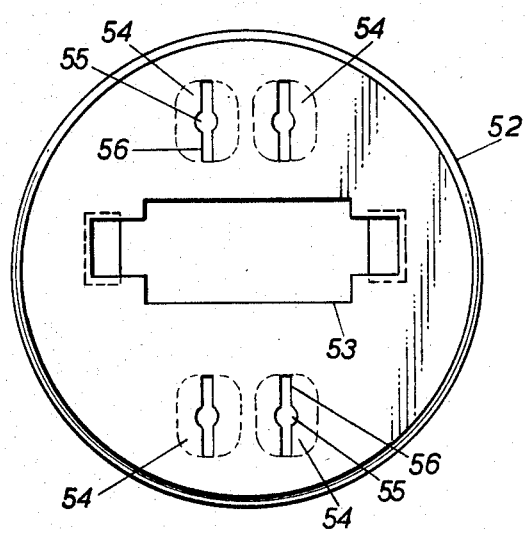

United States Patent Office 3,286,294
Patented Nov. 22, 1966

1

3,286,294
POLISHING DEVICES
Joseph Peter Raffe, London, England, assignor to Reckitt
 & Colman (Overseas) Limited, Hull, England
Filed Aug. 11, 1964, Ser. No. 388,890
Claims priority, application Great Britain, Sept. 13, 1963,
36,104
11 Claims. (Cl. 15—258)

This invention relates to polishing and is particularly concerned with a device for polishing leather.

According to the present invention, collapsible polishing means are provided. Preferably the polishing means are of articulated structure whereby collapsing may be effected.

Thus the polishing means may take the form of three hingedly connected sections carrying bristles but it is preferred that the sections carry a pad of a polishing material such as sponge or a resilient polyurethane foam. If the hingedly interconnected sections which form the back of the polishing means are of rigid material, the pad may provide the hinge connection. If, however, these sections are made of a flexible material of the plastics class, the three sections may be continuous and the flexible material connecting adjacent sections then acts as a hinge.

The polishing surface of the pad is preferably of serpentine configuration in the direction of its length. In this case, the folds of the surface should interlock when the polishing means are collapsed.

In a preferred form of the invention the polishing means are mounted on a holder and the holder is arranged to receive a cover cap for the polishing means in its collapsed position.

The holder may be arranged to receive the cap in the reverse position when it is not covering the polishing means, i.e. when the polishing means is in its extended position ready for use. In the reverse position, the cap serves as a handle. Alternatively, the reverse side of the holder may carry a pad impregnated with polish and receive a second cover cap, for the impregnated pad. The pad may be made from a resilient polyurethane foam. The second cover cap may be a push fit within or over a rim on the holder or within a groove in the holder.

The articulated portions of the polishing means may be spring loaded to facilitate extension of the polishing means from the collapsed position but alternatively, the brush may extend from its collapsed position by gravity and be clipped to the holder when extended.

The mounting of the polishing means on the holder may be a permanent mounting of the central portion of the polishing means, for example by means of an adhesive, or alternatively the central portion of the polishing means may be a screw fit or a friction fit in the holder or may be attached to the holder by means of press studs.

In a preferred mounting of the polishing means on the holder, the central portion of the brush is a polishing means fit in or on the holder. Thus the central portion of the polishing means may carry an attachment, such as a disk, and the attachment may be a push fit in or on the holder. To enable it to carry the attachment, the central portion of the polishing means may be provided with projections, such as spigots, and these are secured in corresponding holes in the attachment.

Preferably the projections on the central portion of the polishing means are secured in holes in the attachment which are of smaller diameter than the projections but which are intersected by slots located in the attachment, the arrangement being such that by virtue of the slots, the projections can be forced into the holes to give a very tight fit such that the projections cannot readily be withdrawn from the holes. This arrangement is facilitated by locating the holes and slots in a portion of the attachment which has a reduced thickness as compared with the general thickness of the attachment.

The cap which covers the polishing means in its collapsed position may be a push fit either on the attachment or on the holder.

In a further form of the invention, the polishing means is mounted on a holder which is itself articulated to form a cover for the polishing means in its collapsed position and a handle for the polishing means in its extended position.

In yet another form of the invention, the polishing means in its collapsed position is housed in a container and is mounted on a holder which is held in the mouth of the container when the polishing means is in the extended position.

The invention will now be further described by way of example with reference to the accompanying drawings, in which:

FIG. 1 is a side elevation, partly in section, of a collapsible polishing device with the polishing means in its collapsed position, FIG. 2 is a side elevation of the device shown in FIG. 1 but with the polishing means in its extended position, FIG. 3 is a side elevation in section of an articulated base for a polishing means, FIG. 4 is a plan view corresponding to FIG. 3, FIGS. 5 and 6 are perspective views of another form of collapsible polishing device with the polishing means in collapsed and extended positions respectively, FIGS. 7 and 8 are side elevations, partly in section, of a further form of collapsible polishing device with the polishing means in extended and collapsed positions respectively, FIGS. 9 and 10 are side elevations, partly in section, of yet another form of collapsible polishing device with the polishing means in collapsed and extended positions respectively, FIG. 11 is a side elevation in section of another articulated base for a polishing means, FIG. 12 is a plan view corresponding to FIG. 11, FIG. 13 is a section along the line 13—13 of FIG. 11, FIG. 14 is a section along the line 14—14 of FIG. 11, FIG. 15 is a section along the line 15—15 of FIG. 11, FIG. 16 shows a modified form of the spigot shown in FIGS. 11 and 15, FIG. 17 is a sectional elevation of an attachment according to the invention indicating its relation to adjacent parts, and FIG. 18 is a plan view of the attachment shown in FIG. 17.

In the drawings like numbers refer to like parts.

In FIGS. 1 and 2, a circular holder carries a polishing means 12 on one side and an impregnated pad 13 on the other side for applying polish. Cylindrical cover caps 14, 15 fit over the polishing means 12 and pad 13 respectively, each being a push fit on the holder.

The polishing means 12 is in three articulated sections 12a, 12b and 12c which are also connected by springs 16, the middle section 12b being mounted on the holder 11. Although they may carry a brush, in the preferred form shown, the three sections carry a polishing pad 17 of a resilient polyurethane foam and having a serpentine polishing surface 17a, the folds of which interlock when the polishing means is in its collapsed position as shown in FIG. 1. The cap 14 is provided with stops 19 for holding the polishing means 12 in its closed position. When the cap 14 is removed, the springs 16 extend the polishing means to the position shown in FIG. 2. When the polishing means is in the extended position shown in FIG. 2, the cap 15 serves as a handle for the polishing means.

In FIGS. 3 and 4, an articulated base 20 of a flexible material of the plastics class, e.g. polythene, is generally in the form of a tray, the sides of which are cut away at 21 and the base is provided with grooves 20d to permit the base to be collapsed into the position shown in chain dotted lines in FIG. 3 by virtue of the flexibility of the material of the base. The base thus comprises three articulated sections 20a, 20b, 20c, and a torsion spring 22 which passes through section 20b and has its ends secured in sections 20a and 20c is arranged to urge the end sections 20a and 20c from the collapsed position shown in chain dotted lines in FIG. 3 to the extended position shown in full section in FIG. 3. The centre section 20b carries a stalk 23 for mounting the base on a holder. Thus a hole of appropriate size can be drilled in the centre of a holder of the type designated 11 in FIGS. 1 and 2 and the stalk inserted and secured in the hole. The centre section 20b is further provided with a rim 24 which has curved ends to enable it to fit within the curved rim of a holder of the type designated 11.

In FIGS. 5 and 6, the centre section 12b of the polishing means carries cover members 25, 26, hingedly connected thereto. Member 26 extends in articulated sections 26a, 26b, the arrangement being such that a stud 27 carried by member 25 is positioned to engage in a hole 28 in section 26b so that members 25, 26 cover the pad 17 when in its closed position (FIG. 5). Members 25, 26 carry rims 29 to engage the polishing means 12 and hold it in its closed position when the stud 27 engages in hole 28 and the members 25, 26, 26a, 26b cover the pad and form a neat pack containing the collapsed polishing means 12. As shown in FIG. 6, when the polishing means 12 is extended, the members 25, 26, 26a, 26b may be folded in the reverse direction to that indicated in FIG. 5 and the stud 27 engaged in hole 28 so that the members 25, 26, 26a, 26b form a holder or handle for the extended polishing means.

In FIGS. 7 and 8, the circular holder 11 on which the collapsible polishing means 12 is mounted has a bead 11a which is a snap fit in a groove 30a in the mouth of a cylindrical container 30.

FIG. 8 shows the polishing means 12 collapsed and in the container 30, which is closed by a lid 31. FIG. 7 shows the polishing means drawn out of the container and with the holder 11 snapped into position in the mouth of the container ready for using the polishing means in its extended position with the container 30 serving as a handle.

In FIGS. 9 and 10, the collapsible polishing means 12 is mounted on a square holder 32. In FIG. 9, a cap 33 of square section covers the polishing means in its collapsed position and is a push fit on the holder 32. The outer sections 12a, 12c of the polishing means carry catches 34. In use, the cap 33 is reversed on the holder to the position shown in FIG. 10 in which it serves as a handle. The polishing means 12 is then extended and the catches 34 engage the edge of the holder 32 to secure the polishing means in its extended position. The catches 34 are flexible to permit engagement with and disengagement from the edge of the holder 32.

In FIGS. 11 to 15, an articulated base 40 of a flexible material of the plastics class, e.g. polythene is generally in the form of a tray, the sides and part of the base of which are cut away at 41 to permit the base to be collapsed into the position shown in chain dotted lines in FIG. 11 by virtue of the flexibility of the material of the base. The base thus comprises three articulated sections 40a, 40b, 40c, and a torsion spring 42 has its ends secured in housings 43 and 44 in sections 40a and 40c respectively. The central section 40b carries members 45, 46 (FIGS. 11, 12 and 15), a groove 47 being located in each member to house the central portion of the spring 42. The spring 42 is arranged to urge the end sections 40a and 40c from the collapsed position shown in chain dotted lines in FIG. 11 to the extended position shown in full section in FIG. 11.

As in the case of the polishing means 12 in FIGS. 1 and 2, the top of the tray 40 is intended to receive a pad of polishing material, such as a pad of polyurethane foam, which may conveniently be secured to the tray by means of adhesive. Thus adhesive may be applied to the base of the tray and the pad then applied to the adhesive. If the adhesive were allowed to come into contact with the ends of the spring 42 in housings 43 and 44, there would be a tendency for these spring ends to become permanently secured to the tray with the result that the action of the spring would be impaired. With a view to preventing the adhesive from reaching the spring ends, the spring housings 43 and 44 are surrounded by raised barrier walls 48 (FIGS. 11 to 15). As may be seen from FIG. 14, grooves 49 are located in the underside of the tray to accommodate portions of the spring between the housings 43 and 44.

The underside of the central portion 40b of the tray carries spigots or pins 50 of substantially cylindrical section, but if desired the spigots may be chamfered as shown at 51 in FIG. 16.

Referring now to FIGS. 17 and 18, an attachment 52 for the central portion of the tray is generally in the form of a disk which is apertured at 53 to accommodate the central section 40b, members 45, 46 and spring 42 when the attachment is secured to the tray as shown in FIG. 17. The disk 52 is provided with four areas of reduced thickness 54 and in each of these a hole 55 is located in a position corresponding to one of the spigots 50. A slot 56, passing through hole 55 is also located in each area 54. Spigots 50 pass through holes 55 to secure the attachment to the tray. The holes 55 are slightly smaller in diameter than the pins 50 but the provision of slots 56 together with the reduced thickness of the areas 54 permits slight expansion of the holes to accommodate the spigots and give a very tight fit rendering withdrawal of the spigots difficult and ensuring that the attachment is firmly secured to the tray.

Also shown in FIG. 17 is part of a holder 57 carrying a resilient polyurethane foam pad 58 impregnated with polish and provided with a cover cap 59 which is a push fit on the holder. The disk 52 is also a push fit on the holder between a stacking rim 60 and an outer rim 61. The stacking rim may be omitted if desired, in which case the disk is a push fit within the outer rim. Thus a convenient method is provided for attaching the polishing means to the holder and the cap 59 serves as a handle for the polishing means. The disk 52 is provided with a step 62 to receive a cover cap 63 for the polishing means in its collapsed position, the cover cap being a push fit on the attachment. Alternatively, the cover cap 63 may be a push fit on the outer rim of the holder if a suitable stop is located on the cap.

I claim:
1. A collapsible polishing means comprising a base member, a pad of a polishing material secured to one face of said base member, said base member consisting of a plurality of sections, and hinge means interconnecting said sections, said pad having a polishing surface of serpentine configuration in the direction of its length and the folds of said surface being arranged to interlock when said base member is collapsed about said hinge means.

2. A polishing device comprising a holder, a collapsible polishing means mounted on said holder, and a cover cap for said polishing means in its collapsed position, said collapsible polishing means comprising a base member, a pad of a polishing material secured to one face of said base member, said base member consisting of three sections in series, and hinge means interconnecting said sections, the outer two of said three sections being swingable about said hinge means between extended and collapsed positions of said base member, and said cover cap being a push fit on said holder when said base member is in its collapsed position.

3. A polishing device as claimed in claim 2 in which the holder has means arranged to receive the cover cap in the reverse position to act as a handle when the base member is in its extended position.

4. A polishing device as claimed in claim 2 and further comprising a pad of a resilient absorbent material mounted on the opposite side of said holder to said collapsible polishing means, and a further cover cap for said pad of resilient absorbent material, said further cover cap being to push fit on said opposite side of said holder and said pad of resilient absorbent material being impregnated with polish.

5. A polishing device comprising a holder, a collapsible polishing means mounted on said holder, and a cover cap for said polishing means in its collapsed position, said collapsible polishing means comprising a base member, a pad of a polishing material secured to one face of said base member, said base member consisting of three sections in series, and hinge means interconnecting said sections, the outer two of said three sections being swingable about said hinge means between extended and collapsed positions of said base member and the centre section of said three sections being a push fit on said holder to mount said polishing means on said holder, said cover cap being a push fit on said holder when said base member is in its collapsed position.

6. A polishing device comprising a holder, a collapsible polishing means mounted on said holder and a cover cap for said polishing means in its collapsed position, said collapsible polishing means comprising a base member, a pad of a polishing material secured to one face of said base member, said base member consisting of three sections in series, and hinge means interconnecting said sections, the outer two of said three sections being swingable about said hinge means between extended and collapsed positions of said base member and the central section of said three sections bearing projections on the face of said base member opposite to that carrying the pad, and an attachment member having holes located therein corresponding to said projections, said projections being secured in said holes and said attachment member being a push fit in said holder to mount said polishing means on said holder.

7. A polishing device as claimed in claim 6 in which the cover cap is a push fit on said attachment member when the base member is in its collapsed position.

8. A polishing device as claimed in claim 6 in which the cover cap is a push fit on the holder when the base member is in its collapsed position.

9. A polishing device comprising a holder, a collapsible polishing means mounted on said holder and a pad of a resilient absorbent material monuted on the opposite side of said holder to said collapsible polishing means, said pad of resilient absorbent material being impregnated with polish and said collapsible polishing means consisting essentially of a base member, a pad of a polishing material secured to one face of said base member, said base member consisting of three sections in series, hinge means interconnecting said sections, the outer two of said three sections being swingable about said hinge means between extended and collapsed positions of said base member, and a plurality of spigots mounted on the face of the central section of said base member opposite to that carrying the pad of polishing material, an attachment member having areas of reduced thickness located therein, holes being located in said areas to correspond to said spigots and slots passing through said holes being located in said areas, said holes being of slightly smaller diameter than said spigots and said spigots being a force fit in said holes a first cover cap for said collapsible polishing means and a second cover cap for said pad of resilient absorbent material, said attachment member being a push fit in said holder to mount said polishing means on said holder, said first cover cap being a push fit on said attachment member when the base member is in its collapsed position and said second cover cap being a push fit on said opposite side of said holder.

10. A polishing device comprising a holder, a collapsible polishing means mounted on said holder, and a cover cap for said polishing means in its collapsed position, said collapsible polishing means comprising a base member, polishing material secured to one face of said base member, said base member being comprised of three sections in series, and hinge means interconnecting said sections, the outer two of said three sections being swingable about said hinge means between extended and collapsed positions of said base member, and said cover cap having a push fit on said holder when said base member is in its collapsed position.

11. A polishing device comprising a holder, a collapsible polishing means mounted on said holder and a cover cap for said polishing means in its collapsed position, said collapsible polishing means comprising a base member, polishing material secured to one face of said base member, said base member consisting of three sections in series, and hinge means interconnecting said sections, the outer two of said three sections being swingable about said hinge means between extended and collapsed positions of said base member and the central section of said three sections bearing projections on the face of said base member opposite to that carrying the polishing material, and an attachment member having holes located therein corresponding to said projections, said projections being secured in said holes and said attachment member being a push fit in said holder to mount said polishing means on said holder.

References Cited by the Examiner

UNITED STATES PATENTS

| 2,865,036 | 12/1958 | Poritz | 15—119.1 |
| 2,945,250 | 7/1960 | Worthington | 15—534 X |
| 3,150,406 | 6/1964 | Obitts | 15—512 |

FOREIGN PATENTS

| 5,556 | 3/1891 | Great Britain. |

CHARLES A. WILLMUTH, *Primary Examiner.*

S. E. BECK, *Assistant Examiner.*